(12) United States Patent
Arisawa

(10) Patent No.: US 7,048,196 B2
(45) Date of Patent: May 23, 2006

(54) DATA COMMUNICATION DEVICE

(75) Inventor: Shigeru Arisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/919,304

(22) Filed: Aug. 17, 2004

(65) Prior Publication Data

US 2005/0127190 A1 Jun. 16, 2005

(30) Foreign Application Priority Data

Aug. 21, 2003 (JP) ............................. 2003-297592

(51) Int. Cl.
*G06K 19/06* (2006.01)
(52) U.S. Cl. ...................... 235/492; 235/451
(58) Field of Classification Search ............... 235/492, 235/380, 451, 493; 327/333; 326/62; 363/89
See application file for complete search history.

(56) References Cited

U.S. PATENT DOCUMENTS

| | | | |
|---|---|---|---|
| 5,045,770 A | | 9/1991 | Brooks |
| 5,173,849 A | | 12/1992 | Brooks |
| 5,670,772 A | * | 9/1997 | Goto ........................... 235/493 |
| 5,889,273 A | * | 3/1999 | Goto ........................... 235/492 |
| 6,079,622 A | * | 6/2000 | Goto ........................... 235/492 |
| 6,464,145 B1 | * | 10/2002 | Chimura ..................... 235/492 |
| 6,560,082 B1 | * | 5/2003 | Arisawa ....................... 361/84 |
| 6,601,770 B1 | * | 8/2003 | Ikefuji et al. ............... 235/492 |
| 6,614,672 B1 | * | 9/2003 | Shona ........................... 363/89 |

FOREIGN PATENT DOCUMENTS

JP 02-213991 8/1990

* cited by examiner

*Primary Examiner*—Steven S. Paik
(74) *Attorney, Agent, or Firm*—Oblon, Spivak, McClelland, Maier & Neustadt, P.C.

(57) ABSTRACT

A data communication device includes a first antenna; a semiconductor circuit for generating signals for use in outputting communication data through the first antenna, the semiconductor circuit having a CMOS configuration of a combination of a P-channel MOS transistor and an N-channel MOS transistor on a single chip; and an antenna connection circuit through which the semiconductor circuits is connected to the first antenna. The semiconductor circuit includes a power-supply-connecting MOS drain output part and a ground-connecting MOS drain output part. The antenna connection circuit has a first electric element for inhibiting a current from flowing into the corresponding semiconductor circuit in the power-supply-connecting MOS drain output part.

9 Claims, 6 Drawing Sheets

DATA COMMUNICATION DEVICE

BACKGROUND OF THE INVENTION

1. Field of the Invention

The present invention relates to data communication devices that are communication tools, such as readers-writers, each having an antenna driven by a semiconductor circuit including a combination of metal oxide semiconductor (MOS) transistors. More particularly, the present invention relates to a data communication device configured to prevent latchup in a semiconductor circuit based on an external magnetic field received by an antenna.

2. Description of the Related Art

Non-contact integrated circuit (IC) cards for wireless data communication have been utilized in various fields in recent years. IC cards, which are devices each including a central processing unit (CPU) functioning as data processing means, a memory functioning as data storage means, and data communication means, are applied to various fields. For example, ticket information or season-ticket information is stored in a memory in an IC card and the stored information is read by using a reader-writer installed at a ticket gate in a station to perform ticket-gate control based on the read information. Alternatively, an IC card is used as electronic money for electronic settlement or is used as a cash card, an employee identification (ID) card, or an ID card including a club card.

Reading information from an IC card or writing information in the IC card is performed via communication with external equipment, such as a reader-writer, that is capable of communicating with the IC card. However, since the IC card itself has no power supply provided therein, it operates with electric power externally supplied. Specifically, an IC card is structured such that electromagnetic waves supplied from a reader-writer, which is external equipment, are received by an antenna provided in the IC card, a voltage generated at both ends of the antenna is rectified, and the rectified voltage is supplied to circuits in the IC card as electric power.

Basically, in an IC card, carrier waves supplied from an external reader-writer are rectified to provide a direct-current power supply that is used as a driving power supply for internal circuits including a processor and a memory. Even if an IC card is incorporated in a device, such as a portable device, having a power supply, the IC card cannot use the power supply of the device. However, integrating a reader-writer function with an IC card function on a single semiconductor chip can reduce the mounted area. This integration is advantageous to mount in a small device, such as a cellular phone, and such an IC module having the integrated functions is in widespread use. Connecting an antenna for the reader-writer and an antenna for the IC card to the input and output terminals of the IC module enables non-contact communication with an external IC card or an external reader-writer.

In order to mount an IC module having the reader-writer function and the IC card function integrated therein in devices, such as portable devices, required for being downsized, two antennas for the reader-writer and the IC card are adjacently provided or a common antenna is shared between the reader-writer and the IC card to improve the space utilization and reduce the cost. Such a circuit configuration is disclosed in, for example, Japanese Unexamined Patent Application Publication No. 11-213111.

However, when electromagnetic waves supplied from an external device, such as a reader-writer, are received by the adjacent antennas (or common antenna) for supplying electric power to the IC card function, so-called latchup disadvantageously occurs. Latchup is a phenomenon in which a current continues to flow through a semiconductor device in the reader-writer because electric signals caused by the electromagnetic waves are supplied to a transmitting circuit in the reader-writer. This is a problem caused by the configuration of a complementary metal oxide semiconductor (CMOS) used as the semiconductor circuit in the reader-writer.

FIG. 1 is a diagram illustrating the effect of reception of external electromagnetic waves in an IC module 110. Referring to FIG. 1, the IC module 110 includes an IC card circuit 111, a reader-writer transmitter circuit 112, and a reader-writer receiver circuit 113. When an IC-card antenna 121 is provided adjacent to a transmitting and receiving antenna 122 for a reader-writer or the IC-card antenna 121 and the transmitting and receiving antenna 122 for the reader-writer are structured as one antenna, electromagnetic waves supplied from an external reader-writer 130 are received in both the IC-card antenna 121 and the transmitting and receiving antenna 122 for the reader-writer. As a result, electric signals caused by the electromagnetic waves are supplied to the reader-writer transmitter circuit 112 causing the latchup in the circuit, having the CMOS configuration, for the reader-writer.

As described above, latchup is a phenomenon caused by the configuration of a CMOS used as a semiconductor integrated circuit.

FIG. 2 shows an exemplary circuit configuration of a reader-writer having a CMOS configuration. Referring to FIG. 2, the output ports of CMOSs 210 and 220 are connected to the respective ends of an antenna 200 through the corresponding capacitors. The CMOSs 210 and 220 each have a configuration in which the drain D of an N-channel MOS transistor (NMOS) having electron carriers is connected to the drain D of a P-channel MOS transistor (PMOS) having hole carriers.

In the NMOS, when a gate G has a voltage higher than that of a source S (when the gate G is positive with respect to the source S), an N-type channel is formed between the source S and drain D and the resistance between the source S and drain D is decreased. This corresponds to switching-on. When the gate G has a voltage lower than that of the source S (when the gate G is negative with respect to the source S), no channel is formed and the resistance between the source S and drain D is increased. This corresponds to switching-off. In contrast, in the PMOS, when the gate G has a voltage lower than that of the source S (when the gate G is negative with respect to the source S), a P-type channel is formed between the source S and drain D and the transistor switches on. When the gate G has a voltage higher than that of the source S (when the gate G is positive with respect to the source S), no channel is formed and the transistor switches off.

A signal output through the antenna 200 is set with an output Out1 from the CMOS 210 and an output Out2 from the CMOS 220. An input signal In1 is supplied to the CMOS 210 from a signal supplier (not shown) and an input signal In2 is supplied to the CMOS 220 from the signal supplier. The input signal In1 supplied to the CMOS 210 is a signal inverted by an inverter 230.

For example, when an input signal In1 having a GND level is supplied to the CMOS 210, a PMOS 211 turns on and an NMOS 212 turns off. A signal having a VDD level is output from the CMOS 210 (Out1). Concurrently, an input signal In2 having the VDD level is supplied to the CMOS 220 to turn off a PMOS 221 and to turn on an NMOS 222. A signal having the GND level is output from the CMOS 220 (Out2).

In contrast, when an input signal In1 having the VDD level is supplied to the CMOS 210, the PMOS 211 turns off and the NMOS 212 turns on. A signal having the GND level is output from the CMOS 210 (Out1). Concurrently, an input signal In2 having the GND level is supplied to the CMOS 220 to turn on the PMOS 221 and to turn off the NMOS 222. A signal having the VDD level is output from the CMOS 220 (Out2).

These two output states are sequentially set based on the input signal. A current is generated at a coil functioning as the antenna 200 based on the output Out1 from the CMOS 210 and the output Out2 from the CMOS 220, and an electromagnetic wave corresponding to the input signal is output. The output electromagnetic wave is received by an antenna of an external device, such as an external reader-writer, and the received signal is transmitted.

FIG. 3 is a cross-sectional view of a typical CMOS configuration. The CMOS configuration in FIG. 3 includes a PMOS consisting of an N area (Nwell) 251 on a P-type substrate (Psub) 250 and an NMOS consisting of a P area (Pwell) 252 on the P-type substrate (Psub) 250. Although the P-type substrate (Psub) 250 is shown as distinct from the P area (Pwell) 252 in FIG. 3, the P-type substrate (Psub) 250 and the P area (Pwell) 252 may be set as one area having the identical configuration. The configuration shown in FIG. 3 corresponds to the cross section of the CMOS 210 or the CMOS 220 shown in FIG. 2.

The CMOS includes the N-channel MOS transistor (NMOS) having electron carriers and the P-channel MOS transistor (PMOS) having hole carriers.

As described above, in the NMOS, when the gate G has a voltage higher than that of the source S (when the gate G is positive with respect to the source S), an N-type channel is formed between the source S and drain D and the resistance between the source S and drain D is decreased. This corresponds to switching-on. When the gate G has a voltage lower than that of the source S (when the gate G is negative with respect to the source S), no channel is formed and the resistance between the source S and drain D is increased. This corresponds to switching-off. In contrast, in the PMOS, when the gate G has a voltage lower than that of the source S (when the gate G is negative with respect to the source S), a P-type channel is formed between the source S and drain b and the transistor switches on. When the gate G has a voltage higher than that of the source S (when the gate G is positive with respect to the source S), no channel is formed and the transistor switches off.

As shown by broken lines in FIG. 3, the source and drain electrodes of the PMOS and those of the NMOS have a PN junction structure, and PN-junction diodes are formed in these four electrodes. The PN-junction diode, which is necessarily structured in the MOS, is called a parasitic diode.

Based on this parasitic diode, the CMOS has a circuit configuration including three transistors, that is, a PNP transistor (A), an NPN transistor (B), and a PNP transistor (C), as shown in FIG. 3. It is supposed that latchup is caused in a circuit that is formed based on the parasitic diode.

A sequence whereby latchup occurs will now be described. It is supposed that latchup occurs through the following states from (1) to (6).

(1) When an electrical signal is generated by an external electromagnetic wave in an output part, a forward current flows from a P area 261 of the drain D to the N area (Nwell) 251 in the PMOS.

(2) As a result, the PNP transistor (A) based on the parasitic diode in the N area (Nwell) 251 switches on.

(3) When the PNP transistor (A) switches on, a current flows into the P area (Pwell) 252 (=P-type substrate (Psub) 250) through the PNP transistor (A) to increase the voltages of the P area (Pwell) 252 and the P-type substrate (Psub) 250.

(4) As a result, the NPN transistor (B) based on the parasitic diode in the P area (Pwell) 252 switches on.

(5) When the NPN transistor (B) switches on, a current flows from the N area (Nwell) 251 to the P area (Pwell) 252 (=P-type substrate (Psub) 250) through the NPN transistor (B) to decrease the voltage of the N area (Nwell) 251.

(6) The PNP transistor (C) based on the parasitic diode in the N area (Nwell) 251 switches on along with the reduction in voltage of the N area (Nwell) 251. As a result, a current supplied from a power supply VDD flows from the N area (Nwell) 251 to the P area (Pwell) 252 (=P-type substrate (Psub) 250) through the PNP transistor (C) to increase the voltage of the P area (Pwell) 252 (=P-type substrate (Psub) 250).

The state (6) is equal to the state (3). The change of states in the order of (6)→(3)→(4)→(5)→(6)→(3)→(4) . . . is continuously repeated, so that a current continues to flow through the CMOS configuration in a reader-writer. As a result, power is consumed in a power supply, for example, in a battery and devices are deteriorated. Furthermore, a normal signal output provided when the CMOS functions as a reader-writer is undesirably inhibited.

SUMMARY OF THE INVENTION

In order to solve the problems described above, it is an object of the present invention to provide a data communication device capable of preventing latchup occurring based on a signal externally input.

The present invention provides, in one aspect, a data communication device including a first antenna; a semiconductor circuit for generating signals for use in outputting communication data through the first antenna, the semiconductor circuit having a CMOS configuration of a combination of a P-channel MOS transistor and an N-channel MOS transistor on a single chip; and an antenna connection circuit through which the semiconductor circuit is connected to the first antenna. The semiconductor circuit includes a power-supply-connecting MOS drain output part and a ground-connecting MOS drain output part with the power-supply-connecting MOS drain output part being a drain part of the P- or N-channel MOS transistor connected to a power supply and the ground-connecting MOS drain output part being a drain of the P- or N-channel MOS transistor connected to a ground. The antenna connection circuit has a first electric element for inhibiting a current from flowing into the corresponding semiconductor circuit in the power-supply-connecting MOS drain output part.

The first electric element may be a diode.

It is preferable that the power-supply-connecting MOS drain output part be the drain of the P-channel MOS transistor and the ground-connecting MOS drain output part be the drain of the N-channel MOS transistor.

It is preferable that the antenna connection circuit further include a second electric element for inhibiting a current from flowing from the semiconductor circuit to the antenna connection circuit in the ground-connecting MOS drain output part.

The second electric element may be a diode.

It is preferable that the antenna connection circuit further include a circuit element for preventing excessive voltage reduction at a junction between the power-supply-connecting MOS drain output part and the ground-connecting MOS drain output part.

The circuit element may be a connection to a ground connection configuration through a diode.

It is preferable that the antenna connection circuit further include a limiter connected in parallel to the first antenna and preventing an excessive increase in voltage difference between both ends of the first antenna.

It is preferable that the first electric element be provided for only one of the respective output parts from the semiconductor circuits corresponding to both ends of the first antenna.

The first electric element may be a diode.

It is preferable that the semiconductor circuit include two CMOS semiconductor circuits into which an inverted signal and a non-inverted signal supplied from a signal supplier are respectively input.

It is preferable that the data communication device have an integrated-circuit card function for receiving electric power based on an electromagnetic wave received by the first antenna or a second antenna provided adjacent to the first antenna.

It is preferable that the data communication device have a reader-writer function for writing and/or reading data in and/or from a communication device via data communication through the first antenna and an integrated-circuit card function for receiving electric power based on an electromagnetic wave received by a second antenna provided adjacent to the first antenna.

In the data communication device, such as a reader-writer, having a CMOS configuration according to the present invention, the drains of the two MOSs in each of the semiconductor circuits are output parts, and an electric element, such as a diode, for inhibiting a current from flowing from the antenna connection circuit to the semiconductor circuit is provided in the power-supply-connecting MOS drain output part. Accordingly, even when an electrical signal generated by an external electromagnetic wave is received by the antenna, the diode inhibits a current from flowing into the CMOS. As a result, latchup in which a current is continuously generated in the CMOS circuit based on the parasitic diode existing in the CMOS configuration does not occur, thus realizing the reliable data communication device.

According to the present invention, in the data communication device having an IC-card function part for receiving electric power based on an electromagnetic wave externally received and a reader-writer, no latchup occurs in the reader-writer even when the electric power based on the external electromagnetic wave is received in the IC-card function part. Hence, it is possible to improve the reliability of the data communication device having both the IC-card function part and the reader-writer.

According to the present invention, no latchup occurs due to an electromagnetic wave externally received, so that the power consumption in a battery serving as the power supply can be inhibited and the deterioration of the devices is also inhibited.

The above and other objects, features, and advantages of the present invention will become clear from the following description of the preferred embodiments taken in conjunction with the accompanying drawings.

DESCRIPTION OF THE PREFERRED EMBODIMENTS

A data communication device according to embodiments of the present invention will be described below with reference to the attached drawings.

The data communication device of the present invention includes semiconductor circuits each having a CMOS configuration. The data communication device is applied to equipment, for example, a reader-writer, in which an output in accordance with a signal supplied to a CMOS is transmitted to an antenna through an antenna connection circuit and communication data is output through the antenna.

First Embodiment

Figure 4:
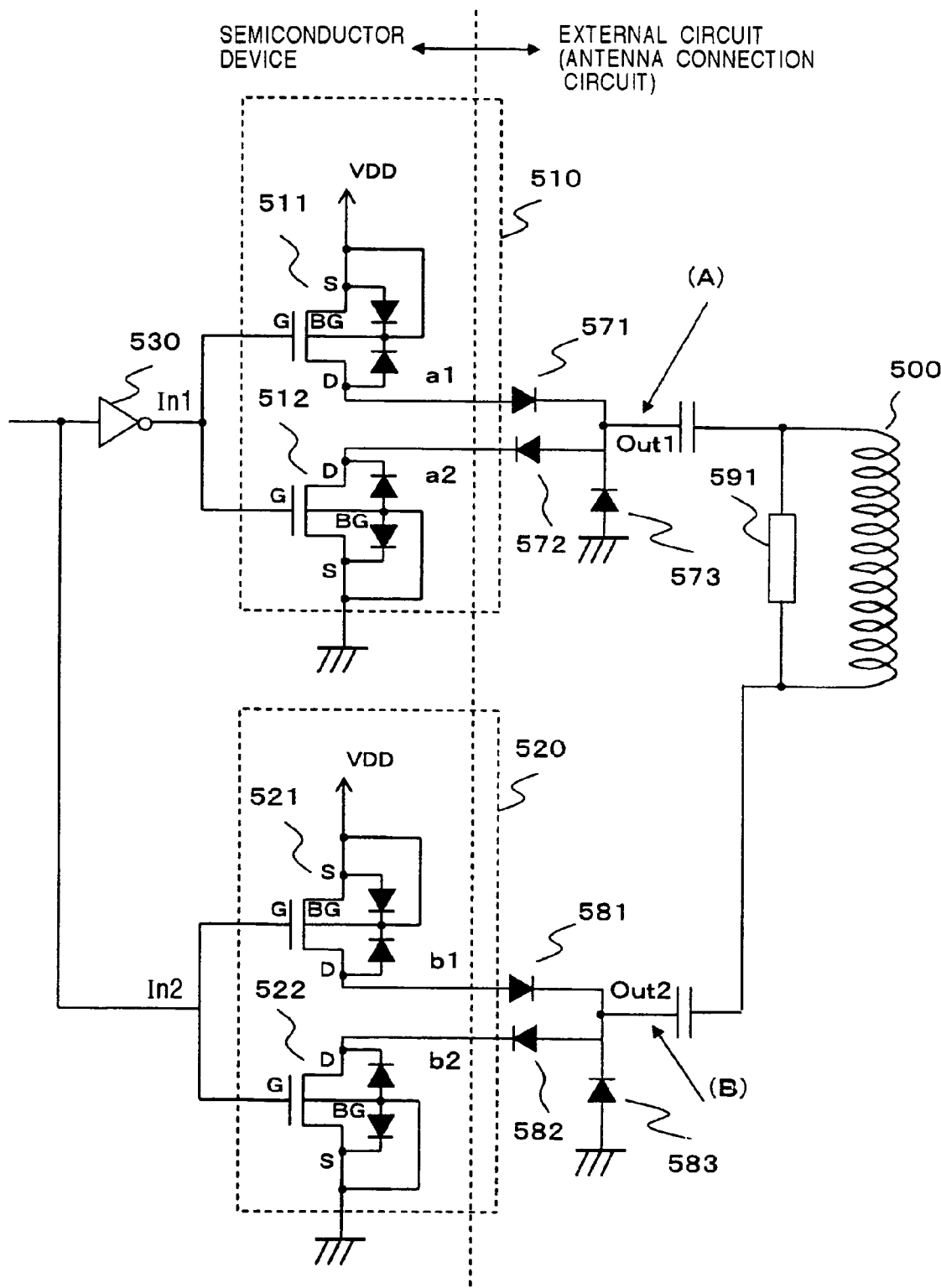
FIG. 4 shows an exemplary circuit configuration of a reader-writer functioning as a data communication device, according to a first embodiment of the present invention.

FIG. 4 shows an exemplary circuit configuration of a reader-writer functioning as a data communication device, according to a first embodiment of the present invention, including semiconductor circuits each having a CMOS configuration.

Referring to FIG. 4, the output ports of CMOSs 510 and 520 are connected to the respective ends of an antenna 500 through the corresponding capacitors. The CMOSs 510 and 520 at the left side are circuits inside a semiconductor device functioning as an IC module. External circuits functioning as antenna connection circuits, at the right side, are connected with output pins of the semiconductor device.

The CMOS 510 includes a P-channel MOS transistor (PMOS) 511 having hole carriers and an N-channel MOS transistor (NMOS) 512 having electron carriers. The CMOS 520 includes a P-channel MOS transistor (PMOS) 521 having hole carriers and an N-channel MOS transistor (NMOS) 522 having electron carriers.

In the CMOSs 510 and 520, the PMOSs 511 and 521 are power-supply connecting MOSs connected to power supplies VDDs and the NMOSs 512 and 522 are ground-connecting MOSs. The drains of the PMOSs 511 and 521 and of the NMOSs 512 and 522 are set as outputting parts capable of being connected to the corresponding external circuits (antenna connection circuits).

Specifically, the CMOS 510 in the semiconductor device has a drain output a1 from the PMOS 511 and a drain output a2 from the NMOS 512, and the CMOS 520 has a drain output b1 from the PMOS 521 and a drain output b2 from the NMOS 522. Accordingly, the semiconductor device has a total of four outputs. These four outputs are, for example, output pins of the semiconductor device.

In each of the NMOSs 512 and 522, when the gate G has a voltage higher than that of the source S (when the gate G is positive with respect to the source S), an N-type channel is formed between the source S and drain D and the resistance between the source S and drain D is decreased. This corresponds to switching-on. When the gate G has a voltage lower than that of the source S (when the gate G is negative with respect to the source S), no channel is formed and the resistance between the source S and drain D is increased. This corresponds to switching-off. In contrast, in each of the PMOSs 511 and 521, when the gate G has a voltage lower than that of the source S (when the gate G is negative with respect to the source S), a P-type channel is formed between the source S and drain D and the transistor switches on. When the gate G has a voltage higher than that of the source S (when the gate G is positive with respect to the source S), no channel is formed and the transistor switches off.

A signal output through the antenna 500 is set with an output Out1 from the CMOS 510 and an output Out2 from the CMOS 520. An input signal In1 is supplied to the CMOS 510 from a signal supplier (not shown), and an input signal In2 is supplied to the CMOS 520 from the signal supplier. The input signal In1 supplied to the CMOS 510 is a signal inverted by an inverter 530. The input signal In2 supplied to the CMOS 520 is a non-inverted signal.

According to the present invention, the CMOS 510 is connected to the antenna connection circuit through electric elements, such as diodes, for inhibiting a current from flowing from one of outputs from the CMOS 510 divided into two. The CMOS 520 is connected to the antenna connection circuit through electric elements, such as diodes, for inhibiting a current from flowing from one of outputs from the CMOS 520 divided into two. Specifically, the output a1 from the drain D of the PMOS 511 in the CMOS 510 is connected to the antenna connection circuit through a diode 571 that permits only a current output from the CMOS 510 to the external circuit. The output a2 from the drain D of the NMOS 512 in the CMOS 510 is connected to the antenna connection circuit through a diode 572 that permits only a current input from the external circuit to the CMOS 510. In addition, a circuit element for preventing excessive voltage reduction, that is, a grounding part through a diode 573 is provided at a junction between the two divided outputs from the CMOS 510 and the antenna connection circuit.

Similarly, the output b1 from the drain D of the PMOS 521 in the CMOS 520 is connected to the antenna connection circuit through a diode 581 that permits only a current output from the CMOS 520 to the external circuit. The output b2 from the drain D of the NMOS 522 in the CMOS 520 is connected to the antenna connection circuit through a diode 582 that permits only a current input from the external circuit to the CMOS 520. In addition, another grounding part through a diode 583 is provided at a junction between the two divided outputs from the CMOS 520 and the antenna connection circuit.

For example, when an input signal In1 having a GND level is supplied to the CMOS 510, the PMOS 511 turns on and the NMOS 512 turns off. A signal having a VDD level is set as the output a1 from the PMOS 511, and the output a1 is supplied to the antenna connection circuit through the diode 571. Concurrently, an input signal In2 having the VDD level is supplied to the CMOS 520 to turn off the PMOS 521 and to turn on the NMOS 522. A signal having the GND level is set as the output b2 from the NMOS 522, and the voltage of the antenna connection circuit is set to the GND level by a current flowing through the diode 582.

In contrast, when an input signal In1 having the VDD level is supplied to the CMOS 510, the PMOS 511 turns off and the NMOS 512 turns on. A signal having the GND level is set as the output a2 from the NMOS 512, and the voltage of the antenna connection circuit is set to the GND level by a current flowing through the diode 572. Concurrently, an input signal In2 having the GND level is supplied to the CMOS 520 to turn on the PMOS 521 and to turn off the NMOS 522. A signal having the VDD level is set as the output b1 from the PMOS 521, and the output b1 is supplied to the antenna connection circuit through the diode 581.

These two output states are sequentially set based on the input signal. A current is generated at a coil functioning as the antenna 500 based on the output Out1 from the CMOS 510 and the output Out2 from the CMOS 520, and an electromagnetic wave corresponding to the input signal is output. The output electromagnetic wave is received by an antenna of an external device, such as an external reader-writer, and the received signal is transmitted.

The operation when an electromagnetic wave causing a disturbance is received by the antenna 500 will now be described.

If the antenna 500 receives an electromagnetic wave causing a disturbance, a variation in voltage occurs at points shown by (A) and (B) in FIG. 4, that is, at the junctions between the semiconductor device and the external circuits. For example, when the voltage at the point (A) increases, no current flows toward the output a1 of the PMOS 511 in the CMOS 510 owing to the diode 571. Accordingly, an increase in voltage is inhibited at the output a1 of the PMOS 511 and, therefore, an increase in voltage at the power supply VDD is inhibited. When the voltage at the point (A) increases, a current flows toward the output a2 of the NMOS 512 in the CMOS 510 through the diode 572. However, the current is grounded through the NMOS 512. Hence, even when the voltage at the point (A) increases, latchup causing a current through the PMOS 511 and the NMOS 512, which are the components in the CMOS 510, does not occur.

Figure 1:
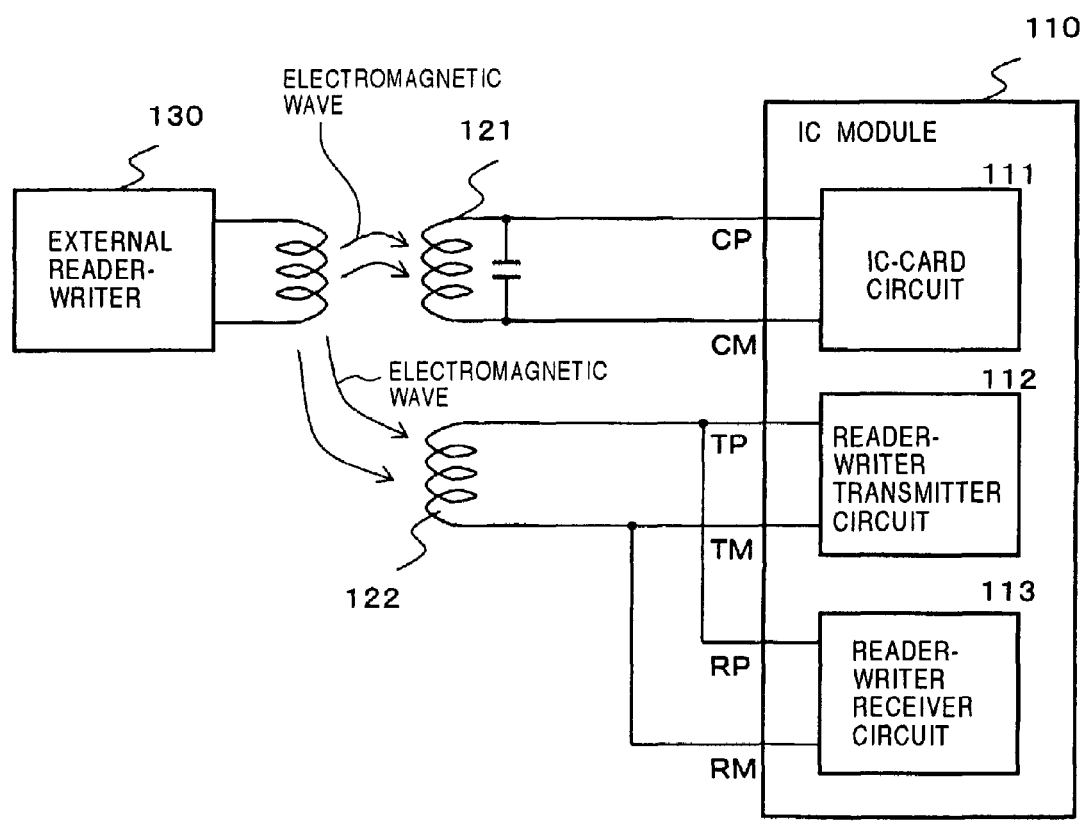
FIG. 1 is a diagram illustrating the effect of reception of external electromagnetic waves in an IC module having a reader-writer function integrated with an IC card function.
Figure 2:
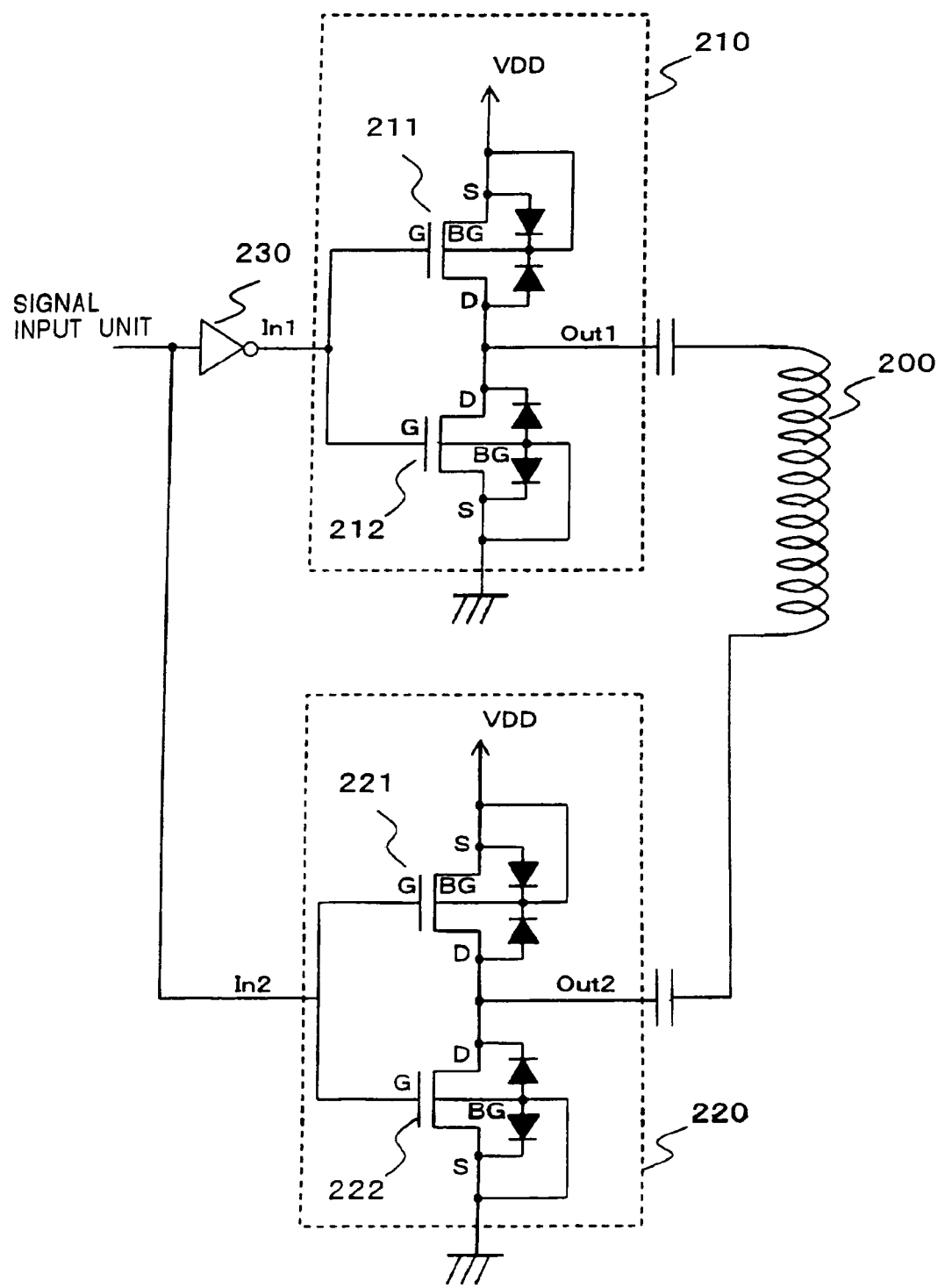
FIG. 2 shows an exemplary circuit configuration of a reader-writer having a typical CMOS configuration.
Figure 3:
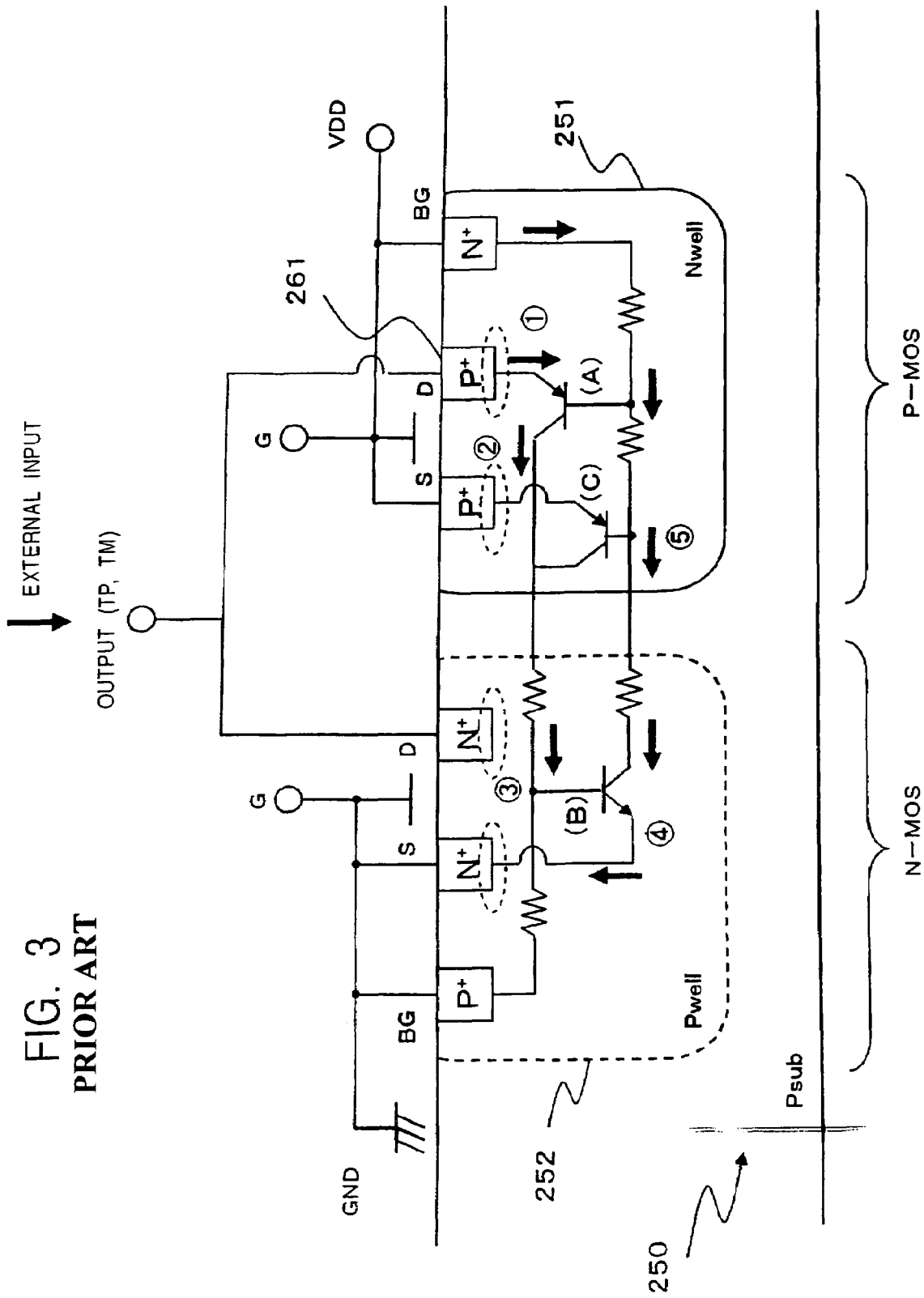
FIG. 3 is a cross-sectional view of the reader-writer having the typical CMOS configuration.

Latchup occurs through the following states from (1) to (6), as described in "Description of the Related Art" with reference to FIG. 3. Reference numerals in the following description are the same as in FIG. 3.

(1) When an electrical signal is generated by an external electromagnetic wave in an output part, a forward current flows from the P area 261 of the drain D to the N area (Nwell) 251 in the PMOS.

(2) As a result, the PNP transistor (A) based on the parasitic diode in the N area (Nwell) 251 switches on.

(3) When the PNP transistor (A) switches on, a current flows into the P area (Pwell) 252 (=P-type substrate (Psub) 250) through the PNP transistor (A) to increase the voltages of the P area (Pwell) 252 and the P-type substrate (Psub) 250.

(4) As a result, the NPN transistor (B) based on the parasitic diode in the P area (Pwell) 252 switches on.

(5) When the NPN transistor (B) switches on, a current flows from the N area (Nwell) 251 to the P area (Pwell) 252 (=P-type substrate (Psub) 250) through the NPN transistor (B) to decrease the voltage of the N area (Nwell) 251.

(6) The PNP transistor (C) based on the parasitic diode in the N area (Nwell) 251 switches on along with the reduction in voltage of the N area (Nwell) 251. As a result, a current supplied from a power supply VDD flows from the N area (Nwell) 251 to the P area (Pwell) 252 (=P-type substrate (Psub) 250) through the PNP transistor (C) to increase the voltage of the P area (Pwell) 252 (=P-type substrate (Psub) 250). The states (3) to (6) are repeated.

With the circuit configuration of the first embodiment, even when an electrical signal is generated by an external electromagnetic wave at the point (A), no forward current flows from the P area 261 of the drain D to the N area (Nwell) 251 in the PMOS, unlike the state (1) described above. As a result, the states (1) to (6) do not occur. According to the circuit configuration of the first embodiment, latchup caused by an external signal input through the antenna 500 is prevented.

Although the operation of the CMOS 510 has been described with reference to FIG. 4, the CMOS 520 has the same configuration and effect as in the CMOS 510. When the voltage at the point (B) increases, no current flows toward the output b1 of the PMOS 521 in the CMOS 520 owing to the diode 581. Accordingly, an increase in voltage is inhibited at the output b1 of the PMOS 521 and, therefore, an increase in voltage at the power supply VDD is inhibited. When the voltage at the point (B) increases, a current flows toward the output b2 of the NMOS 522 in the CMOS 520 through the diode 582. However, the current is grounded through the NMOS 522. Hence, even when the voltage at the point (B) increases, latchup causing a current through the PMOS 521 and the NMOS 522, which are the components in the CMOS 520, does not occur.

When, for example, the voltages at the points (A) and (B) are decreased due to an externally input electromagnetic wave causing a disturbance, the diodes 573 and 583 inhibit an abnormal reduction in voltage at the points (A) and (B), respectively. For example, the diodes 573 and 583 are set such that the voltages at the points (A) and (B) exceed –0.7. Accordingly, an abnormal reduction in voltage due to a signal that is input through the antenna 500 and that is caused by an external magnetic field is inhibited. In addition, it is possible to inhibit the occurrence of a current between the semiconductor devices and the external circuits based on a reduction in voltage at the points (A) and (B).

Referring to FIG. 4, a device connected in parallel to the antenna 500 is a limiter 591 against voltage. The limiter 591 is connected to the antenna 500 for controlling the voltage difference between both ends of the antenna 500 so as to be not greater than a predetermined threshold level (Vmax). The limiter 591 inhibits an abnormal voltage difference between the points (A) and (B) and also inhibits an abnormal increase in voltage at the drains of the CMOSs.

Second Embodiment

An exemplary circuit configuration of a reader-writer according to a second embodiment of the present invention will now be described with reference to FIG. 5. The same reference numerals are used in FIG. 5 to identify the same components in the first embodiment shown in FIG. 4.

Although the respective outputs from the CMOSs 510 and 520 are divided into two in the second embodiment, as in the first embodiment, only one of the divided outputs is connected to the antenna 500 through a diode. Specifically, the output a1 from the drain D of the PMOS 511 in the CMOS 510 is connected to the antenna connection circuit through the diode 571 that permits a current output from the CMOS 510 to the external circuit.

Unlike the first embodiment, the output a2 from the drain D of the NMOS 512 in the CMOS 510 is connected to the antenna connection circuit without a diode. In addition, no grounding part through a diode is provided at the junction between the two divided outputs from the CMOS 510 and the antenna connection circuit, unlike the first embodiment. The output part of the CMOS 520 has the same configuration as that of the CMOS 510.

Figure 5:
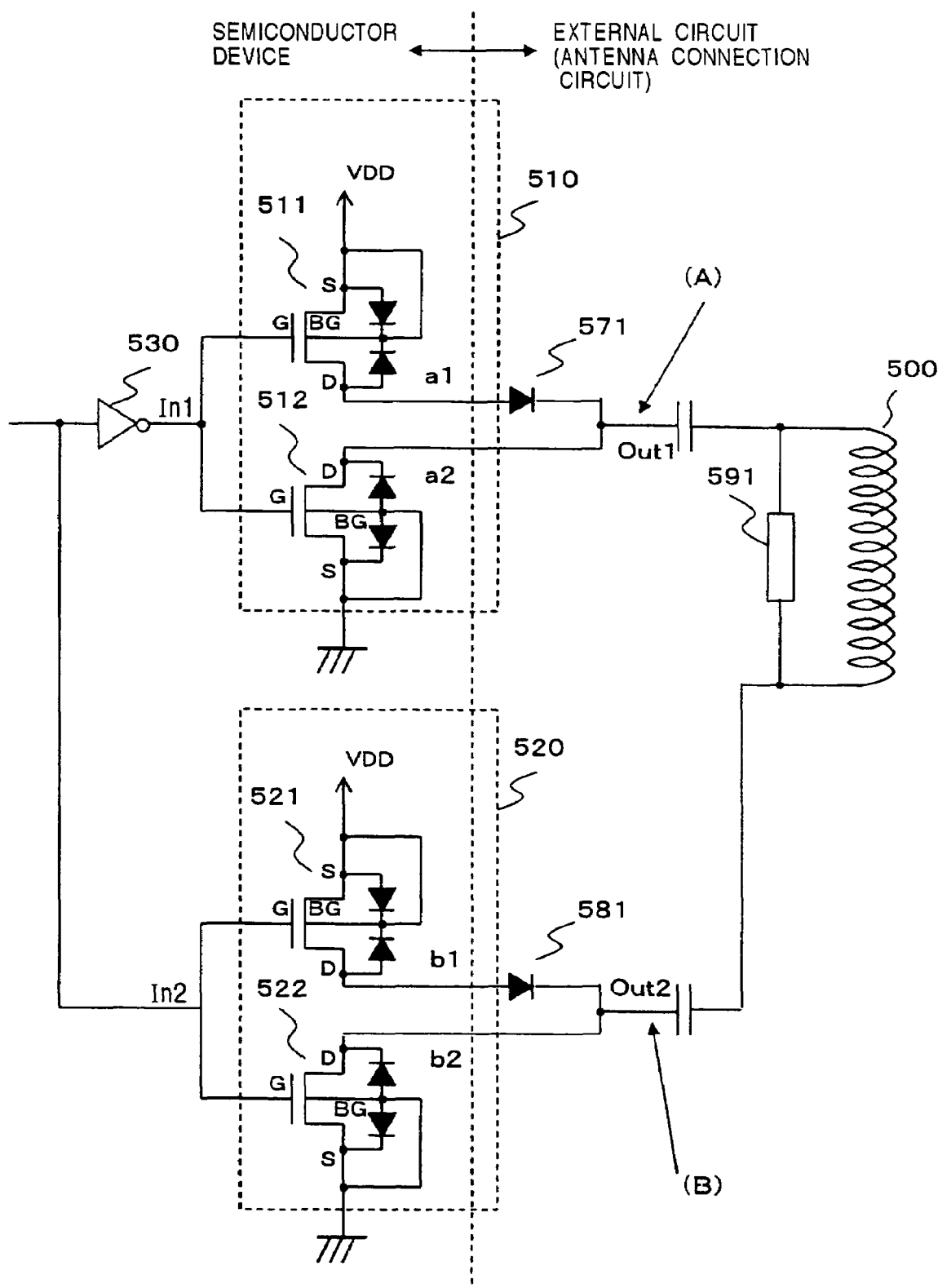
FIG. 5 shows an exemplary circuit configuration of a reader-writer functioning as a data communication device, according to a second embodiment of the present invention.

According to the second embodiment, as in the first embodiment, even when voltages at the points (A) and (B) in FIG. 5 are increased due to an electromagnetic wave causing a disturbance, which is received by the antenna 500, the diode 571 inhibits an increase in voltage at the output a1 of the PMOS 511 in the CMOS 510 and the diode 581 inhibits an increase in voltage at the output b1 of the PMOS 521 in the CMOS 520, thereby preventing the occurrence of latchup.

Third Embodiment

An exemplary circuit configuration of a reader-writer according to a third embodiment of the present invention will now be described with reference to FIG. 6. The same reference numerals are used in FIG. 6 to identify the same components in the first embodiment shown in FIG. 4.

Although the respective outputs from the CMOSs 510 and 520 are divided into two in the third embodiment, as in the first embodiment, only the CMOS 510 has the diodes 571 and 572 connected thereto.

The output a1 from the drain D of the PMOS 511 in the CMOS 510 is connected to the antenna connection circuit through the diode 571 that permits a current output from the CMOS 510 to the external circuit. The output a2 from the drain D of the NMOS 512 in the CMOS 510 is connected to the antenna connection circuit through the diode 572 that permits a current input from the external circuit to the CMOS 510. In addition, the grounding part through the diode 573 is provided at the junction between the two divided outputs from the CMOS 510 and the antenna connection circuit.

The output part of the CMOS 520 is structured as a short-circuited output part without diodes.

Figure 6:
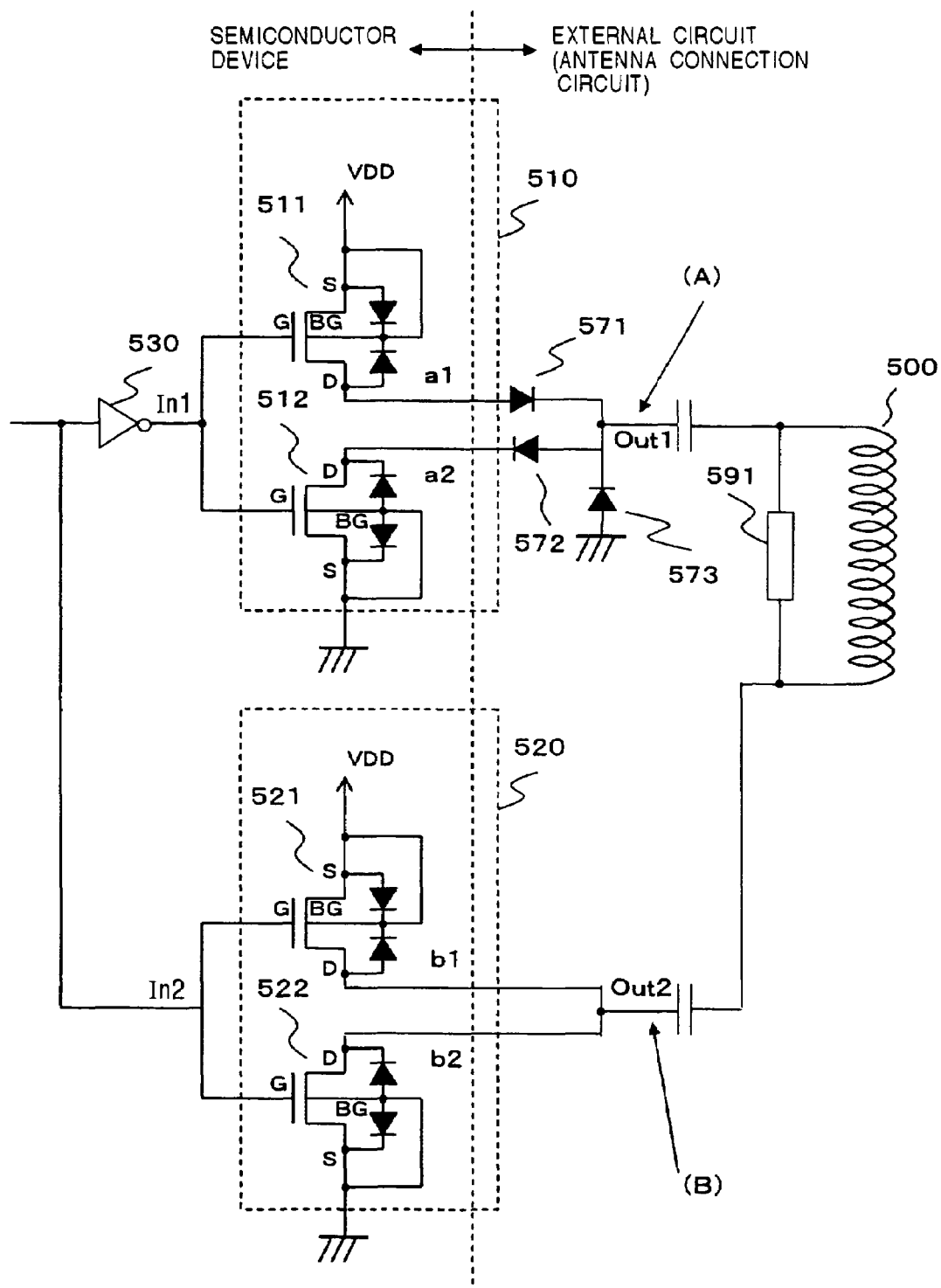
FIG. 6 shows an exemplary circuit configuration of a reader-writer functioning as a data communication device, according to a third embodiment of the present invention.

With this configuration, as in the first embodiment, the voltage at the point (A) in FIG. 6 is increased when the antenna 500 receives an electromagnetic wave causing a disturbance. However, the diode 571 inhibits an increase in voltage at the output a1 from the PMOS 511 in the CMOS 510 and, therefore, no current is generated toward the CMOS 510 based on the increase in voltage at the point (A). Since the occurrence of a change in voltage at the point (A) due to the occurrence of a current toward the CMOS 510 is inhibited, the occurrence of a change in voltage at the point (B) in the CMOS 520 is also inhibited. As a result, an increase in voltage at the output b1 from the PMOS 521 in the CMOS 520 is inhibited, thereby preventing the occurrence of latchup.

As described above, in the data communication device, such as a reader-writer, having a CMOS configuration according to the present invention, even when an electromagnetic wave is received by the antenna, the diodes provided at the junctions between the semiconductor circuits and the antenna connection circuits inhibit a current from flowing into the CMOS configuration. As a result, latchup in which a current is continuously generated in the CMOS circuit based on the parasitic diode existing in the CMOS configuration does not occur, thus realizing the reliable data communication device.

According to the present invention, in the data communication device having an IC-card function part for receiving electric power based on an electromagnetic wave externally received and a reader-writer, no latchup occurs in the reader-writer even when the electric power based on the external electromagnetic wave is received in the IC-card function part. Accordingly, it is possible to improve the reliability of the data communication device having both the IC-card function part and the reader-writer. Hence, the data communication device of the present invention can be utilized as a reliable device having both the IC-card function part and the reader-writer.

While the present invention has been described with reference to what are presently considered to be the preferred embodiments, it is to be understood that the invention is not limited to the disclosed embodiments. On the contrary, it will be further understood by those skilled in the art that the foregoing description is of the preferred embodiments of the present invention and that various changes and modifications may be made to the invention without departing from the spirit and scope thereof. The scope of the following claims is to be accorded the broadest interpretation so as to encompass all such modifications and equivalent structures and functions.

What is claimed is:

1. A data communication device comprising:
   a first antenna;
   a semiconductor circuit for generating signals for use in outputting communication data through the first antenna, the semiconductor circuit having a CMOS configuration of a combination of a P-channel MOS transistor and an N-channel MOS transistor on a single chip; and
   an antenna connection circuit through which the semiconductor circuit is connected to the first antenna,
   wherein the semiconductor circuit includes a power-supply-connecting MOS drain output part and a ground-connecting MOS drain output part, said power-supply-connecting MOS drain output part being a drain part of the P-or N-channel MOS transistor connected to a power supply, said ground-connecting MOS drain output part being a drain of the P-or N-channel MOS transistor connected to a ground and
   wherein the antenna connection circuit has a first diode configured to inhibit a current from flowing into the corresponding semiconductor circuit in the power-supply-connecting MOS drain output part and a second diode configured to inhibit a current from flowing from the semiconductor circuit to the antenna connection circuit in the ground-connecting MOS drain output part.

2. The data communication device according to claim 1, wherein the power-supply-connecting MOS drain output part is the drain of the P-channel MOS transistor and the ground-connecting MOS drain output part is the drain of the N-channel MOS transistor.

3. The data communication device according to claim 1, wherein the antenna connection circuit further includes a circuit element for preventing excessive voltage reduction at a junction between the power-supply-connecting MOS drain output part and the ground-connecting MOS drain output part.

4. The data communication device according to claim 3, wherein the circuit element is a connection to a ground connection configuration through a diode.

5. The data communication device according to claim 1, wherein the antenna connection circuit further includes a limiter connected in parallel to the first antenna and preventing an excessive increase in voltage difference between both ends of the first antenna.

6. The data communication device according to claim 1, wherein the first diode is provided for only one of the respective output parts from the semiconductor circuits corresponding to both ends of the first antenna.

7. The data communication device according to claim 1, wherein the semiconductor circuit comprises two CMOS circuits into which an inverted signal and a non-inverted signal supplied from a signal supplier are respectively input.

8. The data communication device according to claim 1, wherein said data communication device has an integrated-circuit card function for receiving electric power based on an electromagnetic wave received by the first antenna or a second antenna provided adjacent to the first antenna.

9. The data communication device according to claim 1, wherein said data communication device has a reader-writer function for writing and/or reading data in and/or from a communication device via data communication through the first antenna and an integrated-circuit card function for receiving electric power based on an electromagnetic wave received by a second antenna provided adjacent to the first antenna.

* * * * *

UNITED STATES PATENT AND TRADEMARK OFFICE
CERTIFICATE OF CORRECTION

| | | |
|---|---|---|
| PATENT NO. | : 7,048,196 B2 | Page 1 of 1 |
| APPLICATION NO. | : 10/919304 | |
| DATED | : May 23, 2006 | |
| INVENTOR(S) | : Shigeru Arisawa | |

It is certified that error appears in the above-identified patent and that said Letters Patent is hereby corrected as shown below:

Column 3, line 49, change "b" to --D--.

Signed and Sealed this

Twenty-second Day of May, 2007

JON W. DUDAS
*Director of the United States Patent and Trademark Office*